(12) United States Patent
Vantomme et al.

(10) Patent No.: US 10,544,245 B1
(45) Date of Patent: Jan. 28, 2020

(54) PROCESS FOR PREPARING A POLYETHYLENE PRODUCT

(71) Applicant: Total Research & Technology Feluy, Seneffe (Feluy) (BE)

(72) Inventors: Aurélien Vantomme, Mignault (BE); Christopher Willocq, Bousval (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 5 days.

(21) Appl. No.: 15/741,689

(22) PCT Filed: Jul. 13, 2016

(86) PCT No.: PCT/EP2016/066677
§ 371 (c)(1),
(2) Date: Jan. 3, 2018

(87) PCT Pub. No.: WO2017/009386
PCT Pub. Date: Jan. 19, 2017

(30) Foreign Application Priority Data

Jul. 15, 2015 (EP) .................................... 15176886

(51) Int. Cl.
*C08F 210/02* (2006.01)
*B01J 19/24* (2006.01)
(Continued)

(52) U.S. Cl.
CPC .......... *C08F 210/02* (2013.01); *B01J 19/245* (2013.01); *B01J 19/2455* (2013.01); *C08F 2500/05* (2013.01)

(58) Field of Classification Search
USPC .......................................................... 525/52
See application file for complete search history.

(56) References Cited

U.S. PATENT DOCUMENTS 6,864,207 B2 3/2005 Knoeppel et al.
6,930,071 B2 8/2005 Knoeppel et al.
(Continued)

FOREIGN PATENT DOCUMENTS

EP 0277004 A1 8/1988
EP 0427696 A2 5/1991
(Continued)

OTHER PUBLICATIONS

International Search Report issued in PCT/EP2016/066677, dated Sep. 15, 2016, 3 pages.
(Continued)

*Primary Examiner* — Fred M Teskin
(74) *Attorney, Agent, or Firm* — Albert Shung (57) ABSTRACT

The present invention relates to a process for preparing a polyethylene product having a multimodal molecular weight distribution, said process comprising the steps of: (a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of said at least one metallocene catalyst, and optionally hydrogen, in said first slurry loop reactor thereby producing a first polyethylene fraction; (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and (c) feeding the second polyethylene fraction to a gas phase reactor serially connected to the second slurry loop reactor, and in the gas phase reactor polymerizing ethylene, and optionally one or more olefin (Continued)

co-monomers, in the presence of the second polyethylene fraction, and optionally hydrogen, thereby producing the polyethylene product, wherein at least 25% by weight of the polyethylene product is prepared in the first slurry loop reactor.

11 Claims, 2 Drawing Sheets

(51) Int. Cl.
    *C08F 2/34* (2006.01)
    *C08F 2/38* (2006.01)

(56) References Cited

U.S. PATENT DOCUMENTS

| | | | | |
|---|---|---|---|---|
| 8,202,951 | B2 * | 6/2012 | Koch | C08F 10/02 |
| | | | | 526/64 |
| 8,445,599 | B2 * | 5/2013 | Gustafsson | C08F 10/02 |
| | | | | 525/240 |
| 2011/0288237 | A1 | 11/2011 | Gustafsson et al. | |
| 2014/0171601 | A1 | 6/2014 | Bhandarkar et al. | |

FOREIGN PATENT DOCUMENTS

| | | |
|---|---|---|
| WO | 9618662 A1 | 6/1996 |
| WO | 2014016418 A1 | 1/2014 |
| WO | 2015086813 A1 | 6/2015 |

OTHER PUBLICATIONS

Search Report and Written Opinion issued in Singapore Application No. 11201710466R, dated Jan. 25, 2019, 7 pages.

* cited by examiner

PROCESS FOR PREPARING A POLYETHYLENE PRODUCT

CROSS-REFERENCE TO RELATED APPLICATIONS

This application claims the benefit of PCT/EP2016/066677 filed Jul. 13, 2016, which claims priority from EP 15176886.8 filed Jul. 15, 2015, which are incorporated herein by reference in their entireties for all purposes.

TECHNICAL FIELD OF THE INVENTION

The present invention relates to a process for the preparation of a polyethylene product, in particular to a process for the preparation of a polyethylene product having a multimodal molecular weight distribution.

BACKGROUND OF THE INVENTION

Polyethylene (PE) is synthesized by polymerizing ethylene ($CH_2=CH_2$) monomers. Because it is cheap, safe, stable to most environments and easy to be processed, polyethylene polymers are useful in many applications. Polyethylene can be classified into several types, such as but not limited to LDPE (Low Density Polyethylene), MDPE (Medium Density Polyethylene), HDPE (High Density Polyethylene) and LLDPE (Linear Low Density Polyethylene) as well as High Molecular Weight (HMW), Medium Molecular Weight (MMW) and Low Molecular Weight (LMW). Each type of polyethylene has different properties and characteristics.

Ethylene polymerizations are frequently carried out in a loop reactor using ethylene monomer, liquid diluent and catalyst, optionally one or more co-monomer(s) and optionally hydrogen. The polymerization in a loop reactor is usually performed under slurry conditions, with the produced polymer usually in the form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash vessel, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be extruded and pelletized.

An important objective when preparing polyethylene and/or copolymers thereof is the production of high-quality polymers having physical properties within certain specifications. However, polyethylene products often show undesirable characteristics such as unacceptable high levels of gels. Furthermore, bimodal polyethylene resins prepared with metallocene catalysts sometimes lead to finished products with visible defects. In particular, dots or specks and/or rough patches are visible on the surface of end-products such as tubes or pipes made from polyethylene products that were produced using a metallocene catalyst. Such defects can make the pipe weaker and can affect the free flow of liquid through the pipe.

In view of the above, there remains a need in the art for polyethylene products with improved properties such as good homogeneity. In particular, there remain a need in the art for polyethylene products with improved properties such as good homogeneity while ensuring low production costs and high-quality end-products.

SUMMARY OF THE INVENTION

The present invention relates to a process for preparing a polyethylene product having a multimodal molecular weight distribution, said process comprising the steps of:
(a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of said at least one metallocene catalyst, and optionally hydrogen, in said first slurry loop reactor, thereby producing a first polyethylene fraction;
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
(c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product,
wherein at least 10% by weight of the polyethylene product is prepared in the first slurry loop reactor.

Preferably, the present invention provides a process for preparing a polyethylene product having a multimodal molecular weight distribution, said process comprising the steps of:
(a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of said at least one metallocene catalyst, and optionally hydrogen, in said first slurry loop reactor thereby producing a first polyethylene fraction;
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
(c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product, wherein at least 25% by weight of the polyethylene product is prepared in the first slurry loop reactor.

The present process advantageously leads to polyethylene products with improved properties such as satisfactory homogeneity. The present process also allows preparing low density fractions in the gas phase, for example density as low as 0.910 g/cm$^3$. In some embodiments, the present process allows the preparation of polyethylene products suitable for different application such as for pipe, film, caps and closures, rotomolding, artificial grass, geomembrane, blow molding, injection stretch blow molding grade applications.

DETAILED DESCRIPTION OF THE INVENTION

Before the present process of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Preferred statements (features) and embodiments of the polymer resins, processes, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered aspects and embodiments 1 to 13, with any other statement and/or embodiment.

1. A process for preparing a polyethylene product having a multimodal molecular weight distribution, said process comprising the steps of:
    (a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of said at least one metallocene catalyst, and optionally hydrogen, in said first slurry loop reactor thereby producing a first polyethylene fraction;
    (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
    (c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product, wherein at least 10% by weight, most preferably wherein at least 25% by weight of the polyethylene product is prepared in the first slurry loop reactor.

2. The process according to statement 1, wherein at least 30% by weight of the polyethylene product may be prepared in the first slurry loop reactor, with % by weight compared with the total weight of the polyethylene product, preferably, at least 35% by weight, for example at least 40% by weight, for example at least 45% by weight, for example at least 50% by weight, for example at least 55% by weight, for example at least 60% by weight, for example at least 65% by weight, for example at least 70% by weight of the polyethylene product may be prepared in the first slurry loop reactor, with % by weight compared with the total weight of the polyethylene product. Preferably, at least 60% by weight of the polyethylene product may be prepared in the first slurry loop reactor, with % by weight compared with the total weight of the polyethylene product.

3. The process according to any one of statements 1 or 2, wherein the first slurry loop reactor and the second slurry loop reactor operate under conditions which produce substantially identical fractions.

4. Process according to any one of statements 1 to 3, wherein the internal volume of the first loop reactor ranges from at least 50% to at most 150% of the internal volume of the second loop reactor, preferably the internal volume of the first loop reactor may range from at least 60% to at most 140%, from at least 70% to at most 130%, from at least 80% to at most 120%, from at least 90% to at most 110%, from at least 95% to at most 105%, or from at least 95% to at most 101% of the internal volume of the second loop reactor, preferably the internal volume of the first loop reactor may equal the internal volume of the second loop reactor.

5. Process according to any one of statements 1 to 4, wherein step (c) comprises the prior step of flashing the diluent, remaining ethylene monomer, and optionally one or more olefin co-monomers, before feeding the second polyethylene fraction to the gas phase reactor.

6. The process according to any one of statements 1 to 5, wherein the ratio of the melt flow index (MFI) of the first polyethylene fraction to the MI2 of the second polyethylene fraction is ranging from 0.04 to 25, and the ratio of the MI2 of the second polyethylene fraction to the MI2 of the polyethylene product is at least 70, wherein the melt flow index is measured according to the method of the standard test ISO 1133, Condition D at a temperature of 190° C. and under a load of 2.16 kg.

7. The process according to any one of statements 1 to 5, wherein the ratio of the MI2 of the first polyethylene fraction to the MI2 of the second polyethylene fraction is ranging from 0.04 to 25, and the ratio of the MI2 of the second polyethylene fraction to the MI2 of the polyethylene product is at least 150, wherein the melt flow index is measured according to the method of the standard test ISO 1133, Condition D at a temperature of 190° C. and under a load of 2.16 kg.

8. The process according to any one of statements 1 to 5, wherein the ratio of the MI2 of the first polyethylene fraction to the MI2 of the second polyethylene fraction is ranging from 0.1 to 25, and the ratio of the MI2 of the second polyethylene fraction to the MI2 of the polyethylene product is at least 25, wherein the MI2 is measured according to the method of the standard test ISO 1133, Condition D at a temperature of 190° C. and under a load of 2.16 kg.

9. The process according to any one of statements 1 to 8, wherein the density of the polyethylene product is lower than the density of the second polyethylene fraction, wherein the density is measured according to the method of the standard test ASTM 1505 at a temperature of 23° C.

10. Process according to any one of statements 1 to 9, wherein the first polyethylene fraction is a homopolymer and/or the second polyethylene fraction is a homopolymer.

11. Process according to any one of statements 1 to 10, wherein the polyethylene product is a copolymer.

12. Process according to any one of statements 1 to 11, wherein the polyethylene product has a bimodal molecular weight distribution.

13. Formed articles comprising the polyethylene product prepared by the process according to any one of statements 1 to 12.

The present invention provides a process for preparing a polyethylene product having a multimodal molecular weight distribution, said process comprising the steps of:
(a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of said at least one metallocene catalyst, and optionally hydrogen, in said first slurry loop reactor thereby producing a first polyethylene fraction;
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
(c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product, wherein at least 10%, preferably at least 25% by weight of the polyethylene product is prepared in the first slurry loop reactor.

The term "first polyethylene fraction", as used herein, refers to the polyethylene prepared in the first slurry loop reactor (i.e. as obtained at the exit of the first slurry loop reactor) of a series of polymerization reactors comprising at least a first slurry loop reactor, a second slurry loop reactor, and a gas phase reactor, wherein the first slurry loop reactor is connected in series with the second slurry loop reactor, and the second slurry loop reactor is connected in series with the gas phase reactor.

The term "second polyethylene fraction", as used herein, refers to the polyethylene prepared in the second slurry loop reactor (i.e. as obtained at the exit of the second loop reactor) of a series of polymerization reactors comprising at least a first slurry loop reactor, a second slurry loop reactor, and a gas phase reactor, said second polyethylene fraction comprising the first polyethylene fraction, and the polyethylene fraction synthesized in the second reactor only, wherein the first slurry loop reactor is connected in series with the second slurry loop reactor, and the second slurry loop reactor is connected in series with the gas phase reactor.

The term "polyethylene product" as used herein refers to the final polyethylene fluff prepared in the gas phase reactor (i.e. as obtained at the exit of the gas phase reactor) of a series of polymerization reactors comprising at least a first slurry loop reactor, a second slurry loop reactor, and a gas phase reactor, said polyethylene product comprising the first polyethylene fraction, the polyethylene fraction synthesized in the second reactor and the polyethylene fraction synthesized in the gas phase reactor, wherein the first slurry loop reactor is connected in series with the second slurry loop reactor, and the second slurry loop reactor is connected in series with the gas phase reactor.

The term "fluff" or "powder" as used herein refers to the polyethylene material with the hard catalyst particle at the core of each grain and is defined as the polymer material after it exits the polymerization reactor (or final polymerization reactor in the case of multiple reactors connected in series).

The term "polyethylene resin" as used herein refers to both the fluff produced in the first slurry loop reactor, second slurry loop reactor, and/or gas phase reactor, as well as the subsequently melted and/or pelleted polyethylene.

The term "polyethylene pellet" as used herein refers to the polyethylene material that is melted and/or pelleted and can be produced through compounding and homogenizing of the polyethylene product as taught herein, for instance, with mixing and/or extruder equipment.

The polymerization steps in the at least two loop reactors, i.e. in the first loop reactor and the second loop reactor, are performed under slurry conditions. As used herein, the terms "loop reactor" and "slurry loop reactor" may be used interchangeably herein. Accordingly, the terms "first loop reactor" and "first slurry loop reactor" may be used interchangeably herein. Likewise, the terms "second loop reactor" and "second slurry loop reactor" may be used interchangeably herein.

In certain embodiments, each slurry loop reactor may comprise interconnected pipes, defining a reactor path.

In certain embodiments, each slurry loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The loop reactor preferably operates in a liquid full mode.

In certain embodiments, the first and second slurry loop reactors may be connected through means such as a transfer line and/or one or more settling legs. In some embodiments, the first polyethylene fraction may be transferred from the first slurry loop reactor to the second slurry loop reactor through a transfer line. In some embodiments, the first polyethylene fraction may be discharged in batches, sequentially or continuously from the first slurry loop reactor through one or more legs (which can be settling or not), and transferred to the second slurry loop reactor via a transfer line. In an embodiment, the differential pressure is used to move the slurry from one reactor to the second reactor.

The term "slurry" or "polymerization slurry" or "polymer slurry", as used herein refers to substantially a multi-phase composition including at least polymer solids and a liquid phase, the liquid phase being the continuous phase. The solids may include metallocene catalyst and polymerized ethylene.

The polymerization steps in the at least two loop reactors, i.e. in the first loop reactor and the second loop reactor, can be performed over a wide temperature range. In certain embodiments, the polymerization step in the first loop reactor and/or in the second loop reactor may be performed at a temperature from 20° C. to 125° C., preferably from 55° C. to 105° C., more preferably from 60° C. to 100° C. and most preferably from 65° C. to 98° C. Preferably, the temperature in the first loop reactor and/or in the second loop reactor range may be within the range from 65° C. to 100° C. and most preferably from 70° C. to 98° C.

In certain embodiments, the polymerization step in the first loop reactor and/or in the second loop reactor may be performed at a pressure from 20 bar to 100 bar, preferably from 30 bar to 50 bar, and more preferably from 37 bar to 45 bar.

The present invention relates to a process for preparing a polyethylene product having a multimodal molecular weight distribution.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylene with a multimodal molecular weight distribution" or "multimodal polyethylene" it is meant polyethylene with a distribution curve being the sum of at least two, preferably more than two unimodal distribution curves, and refers to a polyethylene product having two or more distinct but possibly overlapping populations of polyethylene macromolecules each having different weight average molecular weights.

Preferably, the present invention provides a process for preparing a polyethylene product having a bimodal molecular weight distribution, said process comprising the steps of:
(a) feeding ethylene monomer, a diluent, at least one metallocene catalyst, optionally hydrogen, and optionally one or more olefin co-monomers into a first slurry loop reactor; polymerizing the ethylene monomer, and the optionally one or more olefin co-monomers, in the presence of said at least one metallocene catalyst, and optional hydrogen, in said first slurry loop reactor thereby producing a first polyethylene fraction;
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
(c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product, wherein at least 10% preferably at least 25% by weight of the polyethylene product is prepared in the first slurry loop reactor.

According to the present process, step (a) comprises feeding ethylene monomer, a diluent, at least one metallocene catalyst, optionally hydrogen, and optionally one or more olefin co-monomers into a first slurry loop reactor.

As used herein, the term "co-monomer" refers to olefin co-monomers which are suitable for being polymerized with ethylene monomers. Co-monomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

As used herein, the term "diluent" refers to diluents in a liquid state, liquid at room temperature and preferably liquid under the pressure conditions in the loop reactor. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are isobutane, butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane.

The term "catalyst", as used herein, is defined as a substance that causes a change in the rate of a chemical reaction.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In one embodiment of the present invention, the metallocene catalyst is a compound of formula (I) or (II)

$$(Ar)_2M^1Q^1_2 \qquad (I);$$

or $$R^3(Ar)_2M^1Q^1_2 \qquad (II),$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, SiR$^1_3$ wherein R$^1$ is a hydrocarbyl having 1 to 20 carbon atoms, and a hydrocarbyl having 1 to 20 carbon atoms, and wherein said hydrocarbyl optionally comprises one or more atoms selected from the group comprising B, Si, S, O, F, Cl, and P;

wherein M$^1$ is a transition metal selected from the group consisting of titanium, zirconium, hafnium, and vanadium; and preferably is zirconium;

wherein each Q$^1$ is independently selected from the group consisting of halogen; a hydrocarboxy having 1 to 20 carbon atoms; and a hydrocarbyl having 1 to 20 carbon atoms and wherein said hydrocarbyl optionally comprises one or more atoms selected from the group comprising B, Si, S, O, F, Cl, and P; and wherein R$^3$ is a divalent group or moiety bridging the two Ar groups and selected from the group consisting of C$_1$-C$_{20}$ alkylene, germanium, silicon, siloxane, alkylphosphine, and an amine, and wherein said R$^3$ is optionally substituted with one or more substituents each independently selected from the group consisting of halogen, hydrosilyl, SiR$^2_3$ wherein R$^2$ is a hydrocarbyl having 1 to 20 carbon atoms, and a hydrocarbyl having 1 to 20 carbon atoms and wherein said hydrocarbyl optionally comprises one or more atoms selected from the group comprising B, Si, S, O, F, Cl, and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

The term "hydrocarboxy having 1 to 20 carbon atoms" refers to a radical having the formula —O—R$_a$, wherein R$_a$ is hydrocarbyl having 1 to 20 carbon atoms. Preferred hydrocarboxy groups are alkoxy groups. The term "alkoxy" or "alkyloxy" as used herein refers to a radical having the formula —O—R$_b$, wherein R$_b$ is alkyl. Non-limiting examples of suitable alkoxy groups include methoxy, ethoxy, propoxy, isopropoxy, butoxy, isobutoxy, sec-butoxy, tert-butoxy, pentyloxy, amyloxy, hexyloxy, heptyloxy and octyloxy. Preferred hydrocarboxy groups are methoxy, ethoxy, propoxy, butoxy, and amyloxy.

As used herein, the term "alkyl" by itself or as part of another substituent, refers to a straight or branched saturated hydrocarbon radical group joined by single carbon-carbon bonds having 1 or more carbon atoms, for example 1 to 20 carbon atoms, for example 1 to 12 carbon atoms, for example 1 to 6 carbon atoms, for example 1 to 4 carbon atoms, for example 2 to 3 carbon atoms. When a subscript is used herein following a carbon atom, the subscript refers to the number of carbon atoms that the named group may contain. Thus, for example, C$_{1-12}$alkyl means an alkyl of 1 to 12 carbon atoms. Examples of C$_{1-12}$alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

As used herein, the term "C$_{3-20}$cycloalkyl", by itself or as part of another substituent, refers to a saturated or partially saturated cyclic alkyl radical consisting of 3 to 20 carbon atoms. Examples of C$_{3-20}$cycloalkyl include cyclopropyl, cyclobutyl, cyclopentyl, cyclohexyl, cycloheptyl and cyclooctyl.

As used herein, the term "C$_{6-20}$aryl", by itself or as part of another substituent, refers to a polyunsaturated, aromatic hydrocarbyl group having a single ring (i.e. phenyl) or multiple aromatic rings fused together (e.g. naphthalene), or linked covalently, typically consisting of 6 to 20 carbon atoms; wherein at least one ring is aromatic. Examples of C$_{6-20}$aryl include phenyl, naphthyl, indanyl, biphenyl, or 1,2,3,4-tetrahydro-naphthyl.

The term "arylalkyl", as a group or part of a group, refers to an alkyl as defined herein, wherein one or more hydrogen atoms are replaced by an aryl as defined herein. Examples of arylalkyl radicals include benzyl, phenethyl, dibenzylmethyl, methylphenylmethyl, 3-(2-naphthyl)-butyl, and the like.

As used herein, the term "alkylaryl", by itself or as part of another substituent, refers to an aryl group as defined herein, wherein one or more hydrogen atoms are replaced by an alkyl as defined herein.

Preferably, the polymerization in step (a) is carried out in the presence of a metallocene comprising a bridged bis-indenyl and/or a bridged bis-tetrahydrogenated indenyl catalyst component. The metallocene can be selected from one of the following formula (IIIa) or (IIIb):

wherein each R is the same or different and is selected independently from hydrogen or XR'v in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents XR'v on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

Preferably, the metallocene comprises a bridged unsubstituted bis-tetrahydrogenated indenyl. More preferably the metallocene is ethylene-bis(tetrahydroindenyl)zirconium dichloride or ethylene-bis(tetrahydroindenyl) zirconium difluoride. Most preferably the metallocene is ethylene-bis(tetrahydroindenyl)zirconium dichloride.

The metallocene catalysts can be provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support. The silica may be in granular, agglomerated, fumed or other form.

In an embodiment, the support of the metallocene catalyst is a porous support, and preferably a porous silica support having a surface area comprised between 200 and 900 $m^2/g$. In another embodiment, the support of the polymerization catalyst is a porous support, and preferably a porous silica support having an average pore volume comprised between 0.5 and 4 mL/g. In yet another embodiment, the support of the polymerization catalyst is a porous support, and preferably a porous silica support having an average pore diameter comprised between 50 and 300 Å, and preferably between 75 and 220 Å.

Preferably, the supported metallocene catalyst is activated. The term "co-catalyst" is used interchangeably with the term "activating agent" and both terms refer to materials that can be used in conjunction with a catalyst in order to improve the activity of the catalyst during the polymerization reaction. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

Examples of aluminium-containing co-catalysts include, among other, dialkyl or trialkyl aluminoxane, dialkyl or trialkyl aluminoxane halide. The aluminoxane component of the aluminium-containing co-catalysts may be selected from methylaluminoxane, ethylaluminoxane, n-butylaluminoxane, and isobutylaluminoxane. Examples of boron-containing co-catalysts include, among other, trityl borate, fluorinated borane, and anilinium borate. Suitable boron-containing co-catalysts may also comprise a triphenylcarbenium boronate such as tetrakis-pentafluoro-phenyl-borato-triphenylcarbenium as described in EP 0427696, or those of the general formula [L'—H]+[B Ar1 Ar2 X3 X4]- as described in EP 0277004 (page 6, line 30 to page 7, line 7).

In an embodiment, alumoxane is used as an activating agent for the metallocene catalyst.

As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (IV) or (V);

$R^a$—(Al($R^a$)—O)$_x$—Al$R^a_2$ for oligomeric linear alumoxanes; or                (IV)

(—Al($R^a$)—O—)$_y$ for oligomeric cyclic alumoxanes                (V)

wherein x is 1-40, and preferably 10-20;
wherein y is 3-40, and preferably 3-20; and
wherein each $R^a$ is independently selected from a $C_1$-$C_8$ alkyl, and preferably is methyl. In a preferred embodiment, the alumoxane is methylalumoxane (MAO).

Preferably, the metallocene catalyst is a supported metallocene-alumoxane catalyst comprising a metallocene and an alumoxane deposited on a porous silica support.

Optionally, other activating agent may be used in polymerization processes. A non-limiting example of an activating agent is an organo-aluminium compound, being optionally halogenated, having general formula Al$R^{11}R^{12}R^{13}$ or Al$R^{11}R^{12}Y^2$, wherein $R^{11}$, $R^{12}$, $R^{13}$ is an alkyl having from 1 to 6 carbon atoms and $R^{11}$, $R^{12}$, $R^{13}$ may be the same or different and wherein $Y^2$ is hydrogen or a halogen, as disclosed in U.S. Pat. Nos. 6,930,071 and 6,864,207, which are incorporated herein by reference. Other activating agents include Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). The activating agent may be added to the loop reactor in an activating agent slurry at a concentration of less than 90% by weight of the activating agent slurry composition, more preferably from 10% to 50% by weight, for instance around 20% by weight. The concentration of the activating agent in the loop reactor may be lower than 200 ppm, more preferably from 10 to 100 ppm, most preferably from 20-70 ppm and for instance around 50 ppm.

Hydrogen may be used to control the chain lengths of the polyethylene products. For the production of polyethylene with higher melt flow index (MFI or MI), i.e. with lower average molecular weight and shorter polymer chains, the concentration of hydrogen in the loop reactor may be increased. Inversely, the hydrogen concentration in the loop reactor may be reduced in order to produce a polyethylene product with lower MFI, i.e. with higher average molecular weight and longer polymer chains.

In a preferred embodiment, step (a) uses reactants comprising the monomer ethylene, isobutane as hydrocarbon diluent, a supported metallocene catalyst, and optionally at least one co-monomer such as 1-hexene.

Step (a) also comprises the step of polymerizing the ethylene monomer, and the optionally one or more olefin co-monomers, in the presence of said at least one metallocene catalyst and optionally hydrogen, in said first slurry loop reactor thereby preparing a first polyethylene fraction.

In some embodiment, step (a) is performed in the presence of hydrogen. In some embodiment, step (a) is performed in the absence of co-monomer. Preferably step (a) is performed in the presence of hydrogen and in the absence of co-monomer.

In certain embodiments, the first polyethylene fraction is a homopolymer (produced in the absence of co-monomer).

According to the present process, step (b) comprises feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction.

In some embodiment, step (b) is performed in the presence of hydrogen. In some embodiment, step (b) is performed in the absence of co-monomer. Preferably step (b) is performed in the presence of hydrogen and in the absence of co-monomer.

In certain embodiments, the second polyethylene fraction is a homopolymer (produced in the absence of co-monomer).

In certain embodiments, the first polyethylene fraction is a homopolymer and/or the second polyethylene fraction is a homopolymer (one or both produced in the absence of co-monomer).

In preferred embodiments, the first polyethylene fraction is a homopolymer and the second polyethylene fraction is a homopolymer (both produced in the absence of co-monomer).

In certain embodiments, the first slurry loop reactor and the second slurry loop reactor may operate in given conditions in order to produce substantially identical fractions. In certain embodiments, the first slurry loop reactor and the second slurry loop reactor may operate under conditions which produce substantially identical fractions. In certain embodiments, the first and second slurry loop reactors connected in series may operate in certain conditions in order to produce substantially identical fractions. The term "substantially identical" refers to identical within tolerances of process control. The term "substantially identical" is therefore to be understood as deviating from the target value due to tolerances which can normally be expected in the polymerization processes. Producing substantially identical fractions in the first and second loop reactors advantageously allows reducing or even avoiding the probability that unreacted or under-reacted particles go directly in the gas phase reactor, where a fraction having a different melt flow is produced, and thereby allows producing a polyethylene product having improved homogeneity.

In certain embodiments, the internal volume of the first slurry loop reactor and the internal volume of the second slurry loop reactor may be substantially identical.

The term "internal volume" or "reactor volume", as used herein, refers to the free volume of the reactor in which the reaction can take place.

In certain embodiments, the internal volume of the first loop reactor may range from at least 50% to at most 150% of the internal volume of the second loop reactor, for example the internal volume of the first loop reactor may range from at least 60% to at most 140%, from at least 70% to at most 130%, from at least 80% to at most 120%, from at least 90% to at most 110%, from at least 95% to at most 105%, or from at least 95% to at most 101% of the internal volume of the second loop reactor, preferably the internal volume of the first loop reactor may equal the internal volume of the second loop reactor.

In certain embodiments, the process may be preceded by a pre-polymerization step. In certain embodiments, the pre-polymerization may be performed in a pre-polymerization (or further or third) slurry loop reactor connected in series with the first loop reactor. In certain embodiments, the internal volume of said pre-polymerization loop reactor may be equal to 2% to 30% of the internal volume of said first loop reactor. Preferably, the internal volume of said pre-polymerization loop reactor may be equal to 1% to 20%, more preferably, equal to 1% to 10% of the internal volume of said first loop reactor.

In certain embodiments, the pre-polymerization step may comprise pre-polymerizing ethylene in the presence of the metallocene catalyst in said pre-polymerization loop reactor connected in series with the first loop reactor.

According to the present process, step (c) comprises feeding the second polyethylene fraction to a gas phase reactor serially connected to the second loop reactor, and in the gas phase reactor polymerizing ethylene, and optionally one or more olefin co-monomers, in the presence of the second polyethylene fraction, and optionally hydrogen, thereby producing the polyethylene product.

The gas phase reactor can be a fluidized bed reactor. The term "fluidized bed reactor" refers to a reactor wherein a gas is passed through a solid material at high enough velocities to suspend the granular solid material and to cause the solid material to behave as though it were a fluid. The solid material may be a particular material or a powder.

In certain embodiments, step (c) may be performed by polymerizing ethylene in the presence of the second polyethylene fraction and in the presence of one or more olefin co-monomers. Preferably, step (c) may be performed by polymerizing ethylene in the presence of the second polyethylene fraction and in the presence of one olefin co-monomer. Said olefin co-monomer is preferably 1-hexene.

In certain embodiments, step (c) may be conducted in a fluidized bed. In certain embodiments, step (c) may be conducted in a fluidized bed in a condensed mode. In certain embodiments, step (c) may be conducted in a fluidized bed in a condensed mode using a condensing agent such as isohexane. In certain embodiments, step (c) may be conducted in a cooled gas phase reactor.

In certain embodiments, step (c) may be conducted in a fluidized bed by passing a gaseous stream comprising ethylene and optionally one or more olefin co-monomer(s), and optionally hydrogen, in a condensed mode, using an inert condensing agent, such as isohexane, continuously through a fluidized bed reactor under reaction conditions and in the presence the second polyethylene fraction at a velocity sufficient to maintain the bed of second polyethylene fraction in a suspended condition.

In certain embodiments, the polymerization step in the gas phase reactor can be performed at a temperature from 60° C. to 115° C., preferably from 70° C. to 110° C., preferably from 75° C. to 85° C. In certain embodiments, the polymerization step in the gas phase reactor can be performed at a pressure from 10 bar to 30 bar, preferably from 15 bar to 25 bar.

In certain embodiments, the second loop reactor and the gas phase reactor may be connected through means such as a transfer line or one or more settling legs. In some preferred embodiments, the second polyethylene fraction may be transferred from the second loop reactor to the gas phase reactor through a transfer line. In some embodiments, the second polyethylene fraction may be discharged in batches, sequentially or continuously from the second loop reactor through one or more settling legs, and transferred to a gas phase reactor via a transfer line. Optionally, the transfer line of the second slurry loop reactor may comprise a high pressure flash unit. The high pressure flash unit may comprise a heated flash pipe and a receiving vessel unit such as a flash tank.

Furthermore, the transfer line of the second loop reactor may optionally comprise a gas displacement zone, which comprises a conduit and a control valve or optionally one or two rotary feeders. There are different ways of implementing the gas exchange zone. One possibility is to have a control valve in the conduit used for transporting the polyethylene resin from the flash unit into the gas phase reactor. The flush gas can then introduced into the conduit upstream the control valve and optionally also below the control valve. An alternative is to have one or two rotary feeders after the flash unit. The rotary feeder can move a part of the gas upwards and a part of the gas downwards. Again, flush gas can be introduced into the conduit between the rotary feeder(s) and the gas phase reactor below and optionally also above the rotary feeder(s).

In certain embodiments of the process, the step c) may comprise the prior step of flashing the diluent, remaining ethylene monomer and optionally one or more olefin co-monomers, before feeding the second polyethylene fraction to the gas phase reactor.

Such step of flashing the liquid phase comprising the diluent, remaining ethylene monomer and optionally one or more olefin co-monomers may be performed by transferring the second polyethylene fraction into a high pressure flash unit, wherein the diluent, remaining ethylene monomer and optionally co-monomer may be removed from the second polyethylene fraction. The flashed second polyethylene fraction may subsequently be introduced into a gas phase reactor. The flash pipe is preferably heated, e.g. by steam or water. If water is used for heating, the heating water can be advantageously taken from the jacket of the loop reactor. The temperature can be selected according to the composition of the liquid phase so that the fluid is essentially evaporated. Typically, the temperature at the receiving vessel of the flash unit may be ranging from 50° C. to 110° C., preferably from 60° C. to 90° C., in particular from 70° C. to 90° C. The pressure at the receiving vessel (flash tank) of the flash unit may be ranging from 1 to 5 bar, preferably from 1 to 3 bar, in particular from 1 to 2.5 bar. The flashing step advantageously allows removing the diluent, remaining ethylene monomer and optionally one or more olefin co-monomers from the second polyethylene fraction.

In certain embodiments, the second polyethylene fraction from the receiving vessel of the flash unit may be directed into the gas phase reactor.

In certain embodiments, the process may comprise a further gas phase polymerization step. In certain embodiments, the process may comprise a step (e.g. step (d)) of feeding the polyethylene product to a further (e.g. second) gas phase reactor serially connected to the first gas phase reactor, and in the further (e.g. second) gas phase reactor polymerizing ethylene, and optionally one or more olefin co-monomers, in the presence of the polyethylene product, thereby obtaining a further (e.g. second) polyethylene product.

In certain embodiments, the process may comprise a step of discharging the polyethylene product from the gas phase reactor. The polyethylene product produced in the gas phase reactor may be withdrawn from the reactor via a discharge conduit arranged at the lower part of the gas phase reactor.

In certain embodiments, the polyethylene product may be extruded, optionally in the presence of additives, to produce a polyethylene pellet.

In certain embodiments of the present process, at least 10% by weight of the polyethylene product is prepared in the first slurry loop reactor, with % by weight compared with the total weight of the polyethylene product. In an embodiment, at least 15% by weight of the polyethylene product may be prepared in the first slurry loop reactor, for example at least 20% by weight. Most preferably at least 25% by weight, for example at least 30% by weight of the polyethylene product may be prepared in the first slurry loop reactor, with % by weight compared with the total weight of the polyethylene product. In certain embodiments, at least 35% by weight, for example at least 40% by weight, for example at least 45% by weight, for example at least 50% by weight, for example at least 55% by weight, for example at least 60% by weight, for example at least 65% by weight, for example at least 70% by weight of the polyethylene product may be prepared in the first slurry loop reactor, with % by weight compared with the total weight of the polyethylene product. Preferably, at least 60% by weight of the polyethylene product may be prepared in the first slurry loop reactor, with % by weight compared with the total weight of the polyethylene product.

In certain embodiments, at most 60% by weight of the polyethylene product may be prepared in the second slurry loop reactor, with % by weight compared with the total weight of the polyethylene product. For example, at most 55% by weight of the polyethylene product may be prepared in the second slurry loop reactor, for example at most 50%, for example at most 45% of the polyethylene product may be prepared in the second slurry loop reactor, with % by weight compared with the total weight of the polyethylene product.

In certain embodiments, the polyethylene product may be a copolymer. The term "copolymer" refers to a polymer such as polyethylene which is made by linking two different types of monomers, such as by linking ethylene and a co-monomer such as 1-hexene, in the same polymer chain.

In certain embodiments, the polyethylene product may be a copolymer comprising the second polyethylene fraction which is a homopolymer. A process wherein the second polyethylene fraction is a homopolymer advantageously allows preparing a polyethylene product with satisfactory properties such as a polyethylene product having good homogeneity and with fewer gels and/or fewer defects such as fewer dots, specks and/or rough patches.

In certain embodiments, the polyethylene product may have a bimodal molecular weight distribution.

The "melt flow index" (MFI), "melt index" (MI), or "melt flow rate" (MFR) is a measure of the ease of flow of the melt of a thermoplastic polymer such as a polyethylene polymer. It is defined as the mass of polymer in grams flowing in 10 minutes through a capillary of specific diameter and length by a pressure applied via prescribed alternative gravimetric weights for alternative prescribed temperatures. The methods are given in ISO 1133. The melt flow index is measured according to the method of the standard test ISO 1133.

The term "MI2" refers to the melt flow index measured according to the method of standard test ISO 1133 Condition D at a temperature of 190° C. and under a load of 2.16 kg. The term "MI5" refers to the melt flow index measured according to the method of standard test ISO 1133 Condition D at a temperature of 190° C. and under a load of 5 kg. The term "HLMI" refers to the high load melt index measured according to the method of standard test ISO 1133 Condition G at a temperature of 190° C. and under a load of 21.6 kg.

The recitation "ratio of the MI2 of a first fraction to the MI2 of a second fraction" or "(MI2 $x_1$)/(MI2 $x_2$)" is meant to encompass the ratio of the MI2 of a first fraction measured according to the method of the standard test ISO 1133 Condition D at a temperature of 190° C. and under a load of 2.16 kg to the MI2 of a second fraction measured according to the method of the standard test ISO 1133 Condition Data temperature of 190° C. and under a load of 2.16 kg.

In certain embodiments, the polyethylene product may be useful for preparing caps and closures. In certain embodiments, the polyethylene product may be useful for preparing pipes. In certain embodiments, the polyethylene product may be useful for preparing rotomoulded articles. In certain embodiments, the polyethylene product may be useful for preparing films.

In certain embodiments, the ratio of the MI2 of the first polyethylene fraction to the MI2 of the second polyethylene fraction may be ranging from 0.04 to 25. In certain embodiments, the ratio of the MI2 of the second polyethylene fraction to the MI2 of the polyethylene product may be at least 70. In certain embodiments, the ratio of the MI2 of the first polyethylene fraction to the MI2 of the second polyethylene fraction may be ranging from 0.04 to 25, and the ratio of the MI2 of the second polyethylene fraction to the MI2 of the polyethylene product may be at least 70. Such polyethylene products have advantageous properties for caps and closures applications and for rotomoulding applications.

In certain embodiments, the ratio of the MI2 of the first polyethylene fraction to the MI2 of the second polyethylene fraction may be ranging from 0.10 to 10.0, and the ratio of the MI2 of the second polyethylene fraction to the MI2 of the polyethylene product may be at least 70. Such polyethylene products have advantageous properties for caps and closures and rotomoulding applications.

In certain embodiments, the ratio of the MI2 of the first polyethylene fraction to the MI2 of the second polyethylene fraction may be ranging from 0.04 to 25, and the ratio of the MI2 of the second polyethylene fraction to the MI2 of the polyethylene product may be at least 150. Such polyethylene products have advantageous properties for pipe grade applications.

In certain embodiments, the ratio of the MI2 of the first polyethylene fraction to the MI2 of the second polyethylene fraction may be ranging from 0.1 to 25. In certain embodiments, the ratio of the MI2 of the second polyethylene fraction to the MI2 of the polyethylene product may be at least 25. Such polyethylene products have advantageous properties for film applications.

In certain embodiments, the density of the polyethylene product may be lower than the density of the second polyethylene fraction, wherein the density is measured according to the method of the standard test ASTM 1505 at a temperature of 23° C.

The process according to the present invention advantageously allows preparing a polyethylene product having good homogeneity and at the same time allows to tailor the properties of the polyethylene product according to the application sought. In some embodiments, said polyethylene product is suitable for pipe grade applications.

The present process is advantageous in that it allows preparing polyethylene products having a multimodal molecular weight distribution, preferably a bimodal molecular weight distribution, with improved properties such as good homogeneity.

The present invention also encompasses formed articles comprising the polyethylene product prepared by the process as taught herein. In particular, the present invention also relates to formed articles comprising the polyethylene product prepared by the process comprising the steps of: (a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of said at least one metallocene catalyst, and optionally hydrogen, in said first slurry loop reactor thereby producing a first polyethylene fraction; (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and (c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product, wherein at least 10%, preferably at least 25% by weight of the polyethylene product is prepared in the first slurry loop reactor.

Due to the improved mechanical properties and homogeneity of the polyethylene product of the present invention, the polyethylene product is suitable for a wide variety of applications. Preferred articles are pipes, caps and closures, fibers, films, sheets, containers, foams, rotomoulded articles, injection molded articles and injection stretch blow molded articles; artificial grass, and geomembranes. Most preferred articles are pipes and caps and closures.

Figure 1:
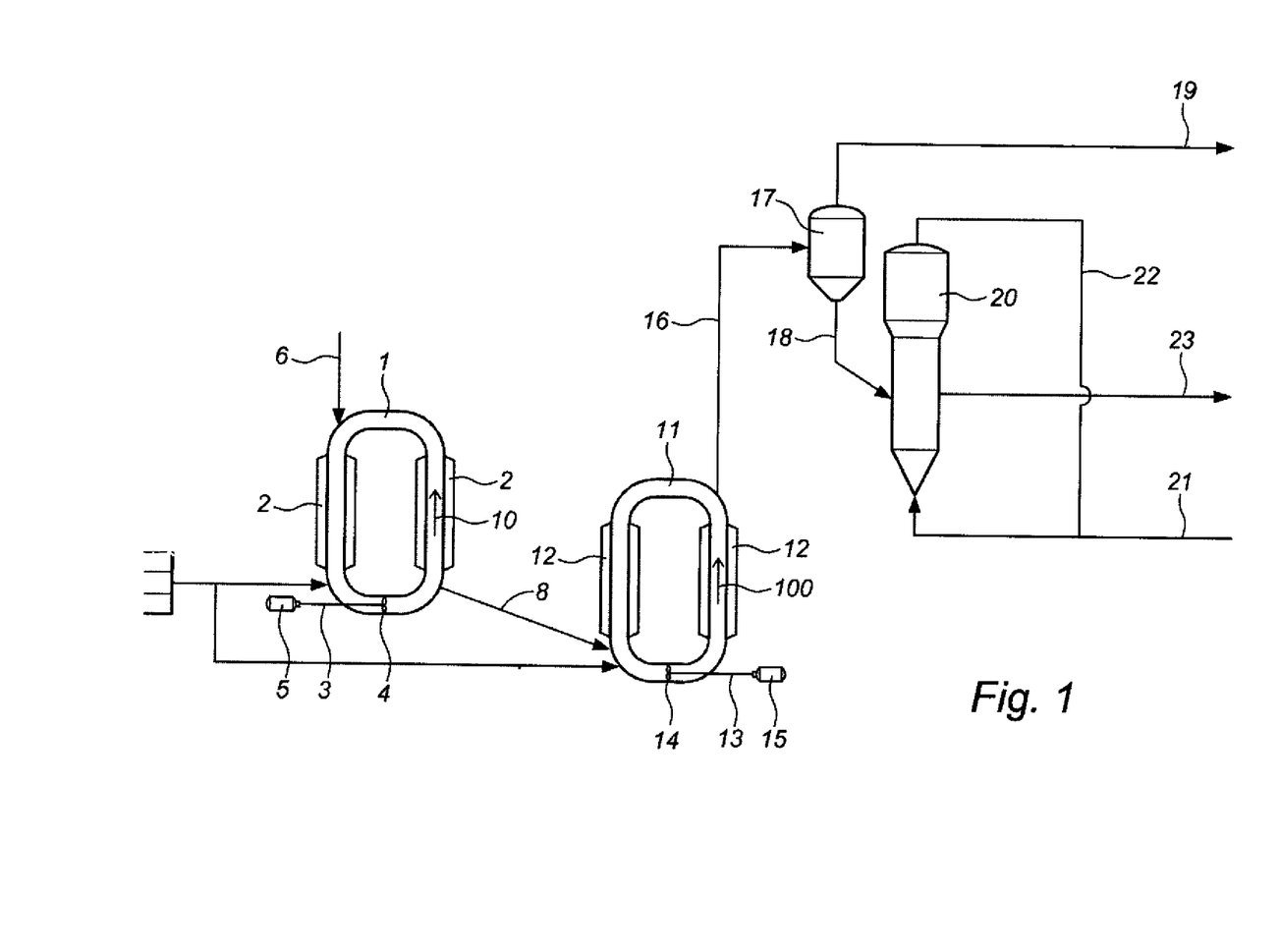
FIG. 1 schematically illustrates an apparatus comprising three serially-connected reactors: arranged as a first slurry loop reactor 1, serially connected to a second slurry loop reactor 11, serially connected to a gas phase reactor 20.

A non-limiting example of an apparatus for performing the process according to the present invention is for instance illustrated in FIG. 1.

FIG. 1 schematically illustrates an apparatus comprising three serially connected reactors 1, 11, 20 configured as a first slurry loop reactor 1 serially connected to a second slurry loop reactor 11 which is serially connected to a gas phase reactor 20. Each of the slurry loop reactors 1, 11 comprises a plurality of interconnected pipes defining a reactor path. It will be understood that while the loop reactors 1, 11 are each illustrated with two vertical pipes, said loop reactors 1, 11 may be equipped with more pipes, such as four or more pipes, for example four or six vertical pipes. The vertical sections of the pipe segments are preferably provided with cooling jackets 2, 12. Polymerization heat can be extracted by means of cooling water circulating in these jackets 2, 12. Catalyst, optionally in conjunction with a co-catalyst or an activation agent, can be injected in the first reactor 1 via the feed line 6. The polymerization slurry is directionally circulated throughout each loop reactor 1, 11 as illustrated by the arrows 10, 100 by one or more pumps, such as axial flow pump 3, 13. As used herein the term "pump" includes any device from compressing driving, raising the pressure of a fluid, by means for example of a piston or set of rotating impellers. Preferably each pump 3, 13 comprises a shaft provided at its end with a set of rotating impellers 4, 14 and is powered by an electric motor 5, 15. The two loop reactors 1 and 11 are connected in series via either one or more settling legs attached of the first loop reactor 1, and/or one or more transfer lines 8.

The second reactor 11 can be serially connected to the gas phase reactor 20 via a polyethylene recovery system comprising one or more settling legs and/or transfer lines 16, a flask tank 17, and a recovery line 18. The transfer line 16 is connected to the flash tank 17. The flash tank 17 is connected to the recovery line 18 for introducing the recovered polyethylene into the gas phase reactor 20. Flashed components are removed by line 19. The gas phase reactor 20 is provided with feed line 21 for introducing monomer and optionally one or more olefin co-monomers into the gas phase reactor 20. The gas phase reactor 20 is also provided with line 22 for recycling monomer and optionally one or more olefin co-monomers to the feed line 21. The gas phase reactor 20 is further provided with one or more polyethylene recovery lines 23 for discharging the polyethylene product for example to a product recovery zone (not shown). The final polyethylene product is dependent upon a wide range of variables which may be separately adjusted in at least one or two loop reactors or in the gas phase reactor, including compositions of the fluidizing mediums in each loop reactor, the polymerization catalysts, the temperatures, pressures, flow rates and other factors maintained in each of the different reactors. Thus, the apparatus as shown in FIG. 1 has the operating flexibility to produce a broad spectrum of polyethylene products with varying physical properties.

In an embodiment, the process according to the present invention is performed in the apparatus described herein above, comprising at least a first slurry loop reactor serially connected to a second loop reactor and at least one gas phase reactor serially connected to the second slurry loop reactor.

Further combinations or preferred embodiments are disclosed in the claims and the FIGS.

The present invention can be further illustrated by the following examples, although it will be understood that these examples are included merely for purposes of illustration and are not intended to limit the scope of the invention unless otherwise specifically indicated.

EXAMPLE

A process was performed according to an embodiment of the present invention to prepare a polyethylene product having a bimodal molecular weight distribution (Example 1). The process was performed in a first slurry loop reactor (Loop reactor 1) connected in series with a second slurry loop reactor (Loop reactor 2), which was connected in series with a gas phase reactor (GPR). The internal volume of the first slurry loop reactor and the internal volume of the second slurry loop reactor were substantially identical. A metallocene catalyst was introduced in the first slurry loop reactor. The metallocene catalyst was ethylene-bis(tetrahydroindenyl)zirconium dichloride.

The operating conditions and results of the multistage polymerization process are shown in Table 1. As illustrated in Table 1, the first polyethylene fraction and the second polyethylene fraction were produced under substantially identical operating conditions.

TABLE 1

| RUN | | | EXAMPLE 1 |
|---|---|---|---|
| LOOP REACTOR 1 OPERATION CONDITIONS | TEMP. | (° C.) | 88 |
| | Pressure | bar | 45 |
| | C2- | (kg/h) | 11.0 |
| | 1-Hexene (C6-) | (kg/h) | 0.00 |
| | H2 | (Nl/h) | 18.5 |
| | IC4 | (kg/h) | 50 |
| LOOP REACTOR 1 OFF-GAS | C2- | (wt. %) | 2.39 |
| | C6- | (wt. %) | 0.00 |
| | H2 | (wt. %) | 0.00 |
| CONTRIBUTION | LOOP REACTOR 1 | (wt. %) | 60.3 |
| RESIDENCE TIME | LOOP REACTOR 1 | (min) | 75.0 |
| PRODUCTIVITY | LOOP REACTOR 1 | (g/g) | 1015 |
| LOOP REACTOR 1 ANALYTICAL RESULTS | MI2 | (g/10 min) | 22 |
| | MI5 | (g/10 min) | 61 |
| | HLMI | (g/10 min) | 323 |
| | DENSITY | (g/cm³) | 0.965 |
| LOOP REACTOR 2 OPERATING CONDITIONS | TEMP. | (° C.) | 90 |
| | Pressure | bar | 42 |
| | C2- | (kg/h) | 8.5 |
| | C6-1-Hexene | (kg/h) | 0.00 |
| | H2 | (Nl/h) | 12.0 |
| | IC4 | (kg/h) | 45 |
| LOOP REACTOR 2 OFF-GAS | C2- | (wt. %) | 3.57 |
| | C6- | (wt. %) | 0.00 |
| | H2 | (vol %) | 0.000 |
| RESIDENCE TIME | LOOP REACTOR 2 | (min) | 47.1 |
| LOOP REACTOR 2 ANALYTICAL RESULTS | MI2 | (g/10 min) | 27 |
| | MI5 | (g/10 min) | 75 |
| | HLMI | (g/10 min) | 342 |
| | DENSITY | (g/cm³) | 0.966 |
| GAS PHASE REACTOR (GPR) OPERATING CONDITIONS | C2- | (kg/h) | 18.0 |
| | Temperature | ° C. | 82 |
| | Pressure | bar | 20 |
| | C6- | (kg/h) | 0.30 |
| | H2 | (Nl/h) | 3.0 |
| GPR COMPOSITION | N2 | (wt. %) | 45.09 |
| | C2- | (wt. %) | 52.80 |
| | C6- | (wt. %) | 0.10 |
| | H2 | (wt. %) | 0 |
| GPR ANALYTICAL RESULTS | MI2 | (g/10 min) | 0.8 |
| | MI5 | (g/10 min) | 2.9 |
| | HLMI | (g/10 min) | 41.5 |
| | DENDITY | (g/cm³)) | 0.952 |

MI2: melt flow index measured according to the method of standard test ISO 1133 Condition D at a temperature of 190° C. and under a load of 2.16 kg; MI5: melt flow index measured according to the method of standard test ISO 1133 Condition D at a temperature of 190° C. and under a load of 5 kg; HLMI: high load melt index measured according to the method of standard test ISO 133 Condition G at a temperature of 190° C. and under a load of 21.6 kg. Density was measured according to ASTM 1505 at 23° C.

The particle size of the resin particles was determined and separated by sieving technique. The sieving operations were performed with a set of 7 calibrated sieves (63, 125, 250, 500, 1000, 1600, 2000 μm) according to ASTM D 1921-89 particle (sieve analysis) of Plastic Materials, Method A.

The molecular weight ($M_n$ (number average molecular weight), $M_w$ (weight average molecular weight), $M_z$ (z average molecular weight)) and molecular weight distributions d ($M_w/M_n$) and d' ($M_z/M_w$) were determined by size exclusion chromatography (SEC) and in particular by gel permeation chromatography (GPC). Briefly, a GPCV 2000 from Waters was used: 10 mg polyethylene sample was dissolved at 160° C. in 10 mL of trichlorobenzene for 1 hour. Injection volume: about 400 μL, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 mL/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})=0.965909\times\log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Figure 2:
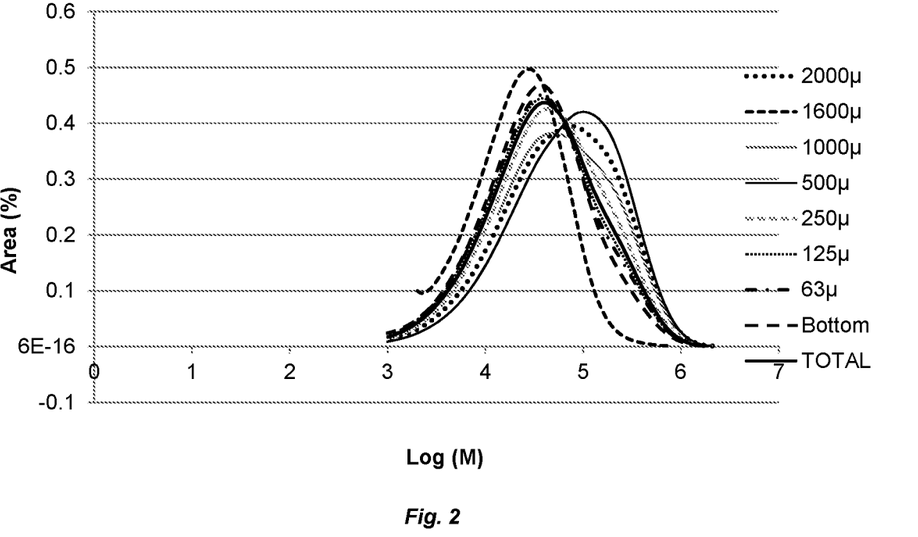
FIG. 2 represents the Gel Permeation Chromatography (GPC) curves of polymer fractions separated on the basis of particle size for an uncompounded particulate metallocene produced polyethylene according to an embodiment of the invention.

The results are given in Table 2. The GPC curves of the polymer fractions separated on the basis of particle size are shown in FIG. 2.

TABLE 2

| Example 1 | Mn | Mw | Mz | D | D' |
|---|---|---|---|---|---|
| <2000 μm | 22132 | 119315 | 333182 | 5.4 | 2.8 |
| 1600-2000 μm | 7373 | 33157 | 86445 | 4.5 | 2.6 |
| 1000-1600 μm | 16145 | 110137 | 334543 | 6.8 | 3 |
| 500-1000 μm | 26185 | 130559 | 335788 | 5 | 2.6 |
| 250-500 μm | 18983 | 93565 | 284535 | 4.9 | 3 |
| 125-250 μm | 16542 | 79737 | 260197 | 4.8 | 3.3 |
| 63-125 μm | 16039 | 77149 | 260115 | 4.8 | 3.4 |
| 0-63 μm | 15462 | 69827 | 239661 | 4.5 | 3.4 |
| TOTAL | 17416 | 85289 | 273716 | 4.9 | 3.2 |
| Mean | 17358 | 89181 | 266808 | 5.1 | 3.0 |
| Std Dev | 5130 | 29210 | 76992 | 0.70 | 0.31 |

The results show that the molecular weight distribution of the polyethylene according to the invention was homogenous and was the same independently of the size of the particles.

Producing the polyethylene product with the process illustrating the present invention, wherein the first polyethylene fraction and the second polyethylene fraction were produced under substantially identical operating conditions advantageously allowed to produce a polyethylene product having improved homogeneity.

Comparative example 1 (Comp exp 1) is a bimodal polyethylene resin prepared in a double loop reactor in the presence of an ethylene-bis(tetrahydroindenyl) zirconium dichloride metallocene catalyst system. The polymerization was carried out in a double loop reactor comprising 2 reactors Rx1 and Rx2. Polymerization was carried out at a temperature of 95° C. under a pressure of about 40 bars in Rx1 and at a temperature of 85° C. under a pressure of about 40 bars in Rx2. Information regarding the polymerization conditions in Rx1 and Rx2 can be found in Table 3.

TABLE 3

Operating conditions and results of a multistage polymerization process according to Comparative example 1

| | Comparative example 1 | | |
|---|---|---|---|
| First reactor (Rx1) operating conditions | Pressure | (Bars) | 42 |
| | Temperature | (° C.) | 95 |
| | Ethylene | (kg/h) | 18 |
| | Comonomer (1-hexene) | (Kg/h) | 0 |
| | H2 | (Nl/h) | 44 |
| Second reactor (Rx2) operating conditions | Pressure | (Bars) | 40 |
| | Temperature | (° C.) | 85 |
| | C2- | (kg/h) | 22 |
| | Comonomer (1-hexene) | (Kg/h) | 1.8 |
| | H2 | (Nl/h) | |

The particle size of the polyethylene particles of comparative example 1 was measured and separated as described for Example 1. The results are given in Table 4.

TABLE 4

| Comp example 1 | Particle size (µm) | | | | | | |
|---|---|---|---|---|---|---|---|
| | 0-63 µm | 63-125 µm | 125-250 µm | 250-500 µm | 500-1000 µm | 1000-1600 µm | 1600-2000 µm |
| % by weight | 0.15 | 3.84 | 23.51 | 52.56 | 19.63 | 0.31 | 0.00 |

Figure 3:
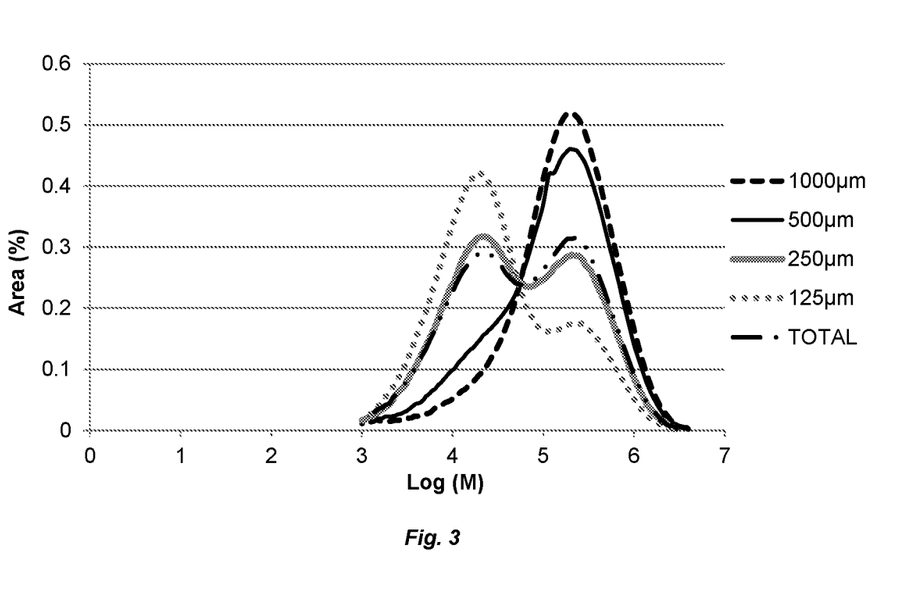
FIG. 3 represents the GPC curves of polymer fractions separated on the basis of particle size for a comparative metallocene produced polyethylene resin.

The molecular weight distributions were determined by GPC as described for Example 1. The results are given in Table 5. The GPC curves of the polymer fractions separated on the basis of particle size are shown in FIG. 3.

TABLE 5

| Comp example 1 | 1600-1000 µm | 1000-500 µm | 500-250 µm | 250-125 µm | Deviation (%) | TOTAL |
|---|---|---|---|---|---|---|
| Mn (g/mol) | 44204 | 31417 | 16734 | 12563 | 55.11 | 17208 |
| Mw (g/mol) | 281768 | 250763 | 159404 | 104342 | 41.07 | 170836 |
| d (Mw/Mn) | 6.4 | 8 | 9.5 | 8.3 | 15.86 | 9.9 |

The results show that the molecular weight distribution of the comparative polyethylene is not homogenous and varies drastically for fractions of different particles sizes.

The invention claimed is:

1. A process for preparing a polyethylene product having a multimodal molecular weight distribution, the process comprising the steps of:
   (a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of the at least one metallocene catalyst, and optionally hydrogen, in the first slurry loop reactor thereby producing a first polyethylene fraction;
   (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
   (c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product,
   wherein at least 25% by weight of the polyethylene product is prepared in the first slurry loop reactor; and
   wherein the ratio of the melt flow index (MFI) of the first polyethylene fraction to the MI2 of the second polyethylene fraction is ranging from 0.04 to 25, and the ratio of the MI2 of the second polyethylene fraction to the MI2 of the polyethylene product is at least 70, wherein the melt flow index is measured according to the method of the standard test ISO 1133, Condition D at a temperature of 190° C. and under a load of 2.16 kg.

2. The process according to claim 1, wherein the first slurry loop reactor and the second slurry loop reactor operate under conditions which produce substantially identical fractions.

3. The process according to claim 1, wherein the internal volume of the first loop reactor ranges from at least 50% to at most 150% of the internal volume of the second loop reactor.

4. The process according to claim 1, wherein step (c) comprises the prior step of flashing the diluent, remaining ethylene monomer, and optionally one or more olefin co-monomers, before feeding the second polyethylene fraction to the gas phase reactor.

5. A process for preparing a polyethylene product having a multimodal molecular weight distribution, the process comprising the steps of:
   (a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of the at least one metallocene catalyst, and optionally hydrogen, in the first slurry loop reactor thereby producing a first polyethylene fraction;
   (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
   (c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product,
   wherein at least 25% by weight of the polyethylene product is prepared in the first slurry loop reactor;

wherein the ratio of the MI2 of the first polyethylene fraction to the MI2 of the second polyethylene fraction is ranging from 0.04 to 25, and the ratio of the MI2 of the second polyethylene fraction to the MI2 of the polyethylene product is at least 150, wherein the melt flow index is measured according to the method of the standard test ISO 1133, Condition Data temperature of 190° C. and under a load of 2.16 kg.

6. A process for preparing a polyethylene product having a multimodal molecular weight distribution, the process comprising the steps of:
(a) feeding ethylene monomer, a diluent, at least one metallocene catalyst, optionally hydrogen, and optionally one or more olefin co-monomers into a first slurry loop reactor; and polymerizing the ethylene monomer, and the optionally one or more olefin co-monomers, in the presence of the at least one metallocene catalyst, and optionally hydrogen, in the first slurry loop reactor thereby producing a first polyethylene fraction;
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing a second polyethylene fraction; and
(c) feeding the second polyethylene fraction to a gas phase reactor serially connected to the second slurry loop reactor, and in the gas phase reactor polymerizing ethylene, and optionally one or more olefin co-monomers, in the presence of the second polyethylene fraction, and optionally hydrogen, thereby producing the polyethylene product,
wherein at least 25% by weight of the polyethylene product is prepared in the first slurry loop reactor;
wherein the ratio of the MI2 of the first polyethylene fraction to the MI2 of the second polyethylene fraction is ranging from 0.1 to 25, and the ratio of the MI2 of the second polyethylene fraction to the MI2 of the polyethylene product is at least 25, wherein the MI2 is measured according to the method of the standard test ISO 1133, Condition D at a temperature of 190° C. and under a load of 2.16 kg.

7. The process according to claim 1, wherein the density of the polyethylene product is lower than the density of the second polyethylene fraction, wherein the density is measured according to the method of the standard test ASTM 1505 at a temperature of 23° C.

8. The process according to claim 1, wherein the first polyethylene fraction is a homopolymer and/or the second polyethylene fraction is a homopolymer.

9. The process according to claim 1, wherein the polyethylene product is a copolymer.

10. The process according to claim 1, wherein the polyethylene product has a bimodal molecular weight distribution.

11. A formed article comprising the polyethylene product prepared by the process according to claim 1.

* * * * *